US006760075B2

(12) United States Patent
Mayer, III et al.

(10) Patent No.: US 6,760,075 B2
(45) Date of Patent: Jul. 6, 2004

(54) METHOD AND APPARATUS FOR SEAMLESS INTEGRATION OF MULTIPLE VIDEO PROJECTORS

(75) Inventors: Theodore Mayer, III, Valley Village, CA (US); Su Wen Wang, Walnut, CA (US)

(73) Assignee: Panoram Technologies, Inc., Sun Valley, CA (US)

( * ) Notice: Subject to any disclaimer, the term of this patent is extended or adjusted under 35 U.S.C. 154(b) by 435 days.

(21) Appl. No.: 09/876,513

(22) Filed: Jun. 6, 2001

(65) Prior Publication Data

US 2002/0057361 A1 May 16, 2002

Related U.S. Application Data

(60) Provisional application No. 60/211,768, filed on Jun. 13, 2000.

(51) Int. Cl.[7] .............................. H04N 5/66; H04N 9/12
(52) U.S. Cl. ........................ 348/383; 348/745; 345/1.3; 353/30
(58) Field of Search ........................... 348/383, 36–39, 348/744, 745; 353/30; 745/1.3

(56) References Cited

U.S. PATENT DOCUMENTS

| 3,833,764 A | 9/1974 | Taylor |
| 4,103,435 A | 8/1978 | Herndon |
| 4,322,741 A | 3/1982 | Kawabayashi |
| 4,345,817 A | 8/1982 | Gwynn |
| 4,355,328 A | 10/1982 | Kulik |
| 4,386,345 A | 5/1983 | Narveson et al. |
| 4,468,693 A | 8/1984 | Fujita et al. |
| 4,645,319 A | 2/1987 | Fekete |
| 4,687,973 A | 8/1987 | Holmes et al. |
| 4,739,396 A | 4/1988 | Hyatt |
| 4,754,332 A | 6/1988 | Bergquist |

(List continued on next page.)

FOREIGN PATENT DOCUMENTS

| JP | 62-195984 | 8/1987 |
| JP | 64-27374 A | 1/1989 |
| JP | 2-228180 | 9/1990 |
| JP | 3-116088 | 5/1991 |
| JP | 3-245687 | 11/1991 |

OTHER PUBLICATIONS

Green, Mark et al., "A New Computer–Human Interface for Aligning and Edge Matching Multichannel Projector Systems," SID 88 Digest, pp. 109–112, Society for Information Display, Playa del Rey, California, May 1988.

Richards, Gerald P., "Digital Geometry Correction in Cursive CRT Displays," SID 86 Digest, pp. 360–361, 1986.

Cowdrey, D. A., "Advanced Visuals in Mission Simulators," AGARD Flight Mechanics Panel Symposium on Flight Simulation, pp. 1–10, Cambridge, 1985.

(List continued on next page.)

*Primary Examiner*—Victor R. Kostak
(74) *Attorney, Agent, or Firm*—Christie, Parker & Hale, LLP

(57) ABSTRACT

Method and apparatus are provided for seamless integration of multiple video projectors. In addition to edge blending, projection artifacts in dark or black image regions caused by residual grays from non-perfect projector black levels are reduced. Overlapped and non-overlapped areas of the image are defined and then the minimum black level of the video signal in non-overlapped areas is boosted without affecting the bright portion of the video signal in order to create uniform black level. The bright portion of the image is then smoothed in the overlapped area with seamless edge blending techniques. The resultant projected image may be passed through a neutral density filter to lower the base black level of the now uniform overlap and non-overlap black regions. The image may also pass through a physical mask which is hard edged or graded and aligned to less than the overall overlap region and that when used, smooths the edge of transition between the non-overlapped and overlapped regions.

18 Claims, 10 Drawing Sheets

U.S. PATENT DOCUMENTS

| | | | |
|---|---|---|---|
| 4,797,942 A | 1/1989 | Burt | |
| 4,799,000 A | 1/1989 | Close | |
| 4,839,720 A | 6/1989 | Isnardi | |
| 4,974,073 A | 11/1990 | Inova | |
| 4,999,703 A | 3/1991 | Henderson | |
| RE33,973 E | 6/1992 | Kriz et al. | |
| 5,136,390 A | 8/1992 | Inova et al. | |
| 5,200,815 A | 4/1993 | Tsujihara et al. | |
| 5,231,481 A | 7/1993 | Eouzan et al. | |
| 5,315,378 A | 5/1994 | Satou et al. | |
| 5,335,082 A | 8/1994 | Sable | |
| 5,361,078 A | 11/1994 | Caine | |
| 5,384,912 A | 1/1995 | Orginc et al. | |
| 5,396,257 A * | 3/1995 | Someya et al. ............. | 345/1 |
| 5,446,479 A | 8/1995 | Thompson et al. | |
| 5,475,447 A | 12/1995 | Funado | |
| 5,487,665 A | 1/1996 | Lechner et al. | |
| 5,495,576 A | 2/1996 | Ritchey | |
| 5,526,051 A | 6/1996 | Gove et al. | |
| 5,532,764 A | 7/1996 | Itaki | |
| 5,703,621 A | 12/1997 | Martin et al. | |
| 5,742,698 A | 4/1998 | Minami et al. | |
| 5,771,072 A | 6/1998 | Tokoro et al. | |
| 5,828,410 A | 10/1998 | Drapeau | |
| 5,838,396 A | 11/1998 | Shiota et al. | |
| 5,872,593 A | 2/1999 | Kawashima | |
| 5,883,476 A | 3/1999 | Noguchi et al. | |
| 6,017,123 A * | 1/2000 | Bleha et al. ............. | 353/30 |
| 6,018,361 A | 1/2000 | Fujii et al. | |
| 6,020,919 A | 2/2000 | Fujii et al. | |
| 6,061,102 A | 5/2000 | Sheppard et al. | |
| 6,075,567 A | 6/2000 | Ohnishi | |
| 6,115,022 A | 9/2000 | Mayer, III et al. | |
| 6,118,493 A | 9/2000 | Duhault et al. | |
| 6,219,011 B1 | 4/2001 | Aloni et al. | |
| 6,219,099 B1 | 4/2001 | Johnson et al. | |
| 6,222,593 B1 | 4/2001 | Higurashi et al. | |
| 6,337,724 B1 | 1/2002 | Itoh et al. | |
| 6,340,976 B1 | 1/2002 | Oguchi et al. | |
| 6,377,306 B1 | 4/2002 | Johnson et al. | |
| 6,480,175 B1 * | 11/2002 | Schneider ............. | 345/32 |

FOREIGN PATENT DOCUMENTS

Fisher, Robert A. et al., "A Full–Field–Of–View Dome Visual Display For Tactical Combat Training," Proceedings of the Image IV Conference, Phoenix, Arizona, pp. 142–150, Jun. 23–26, 1987.

Freeman, Ken et al., "A 1249–Line High–Fidelity Color–TV Projector," SID 82 Digest, pp. 116–117, 1982.

Couturier, Alain, "Multipurpose High–Resolution Projector for Flight Simulator," Proceedings of the Image IV Conference, pp. 102–111, Phoenix, Arizona, Jun. 23–26, 1987.

Holmes, Richard E., "Large Screen Color CRT Projection System with Digital Correction," Large Screen Projection Displays., pp. 16–21, SPIE, vol. 760, 1987.

Holmes, Richard E., "Digital Remote Control for Matrixed Simulator Visual Displays," Proceedings of the Image IV Conference, Phoenix, Arizona, pp. 152–160, Jun. 23–26, 1987.

Holmes, Richard E., "Common Projector and Display Modules for Aircraft Simulator Visual Systems," Presented at the Image V Conference, Phoenix, Arizona, pp. 80–88, Jun. 19–22, 1990.

CompactView X10, "Digital Geometry Corrected Projector," 3D Perception, pp. 1–4.

CompactControl, "Set–Up and Support Tool for Compact-View X10 Projector and CompactU™," Version 3, 3D Perception, pp. 1–2.

CompactU™, "Digital Geometry and Soft Edge Correction Machine," 3D Perception, pp. 1–2.

CompactDesigner, "Design Tool for Projection Theaters," Version 3, 3D Perception, p. 1–2

CompactDeisgner, "Software Package," 3D Perception, p. 1–2.

Spooner, Michael Dr., "The Trend Towards Area of Interest in Visual Simulation Technology," Proceedings of the 4$^{th}$ Interservice/Industry Training Equipment Conference, AD–A122 155, vol. 1, pp. 205–213, Nov. 16–18, 1982.

Basinger, James D. et al., "The Technical Contributions of the Tactical Combat Trainer Development Program," Proceedings of the 4$^{th}$ Interservice/Industry Training Equipment Conference, AD–A122 155, vol. 1, pp. 217–230, Nov. 16–18, 1982.

Lyon, Paul, "A Wide Field–Of–View CRT Projection System with Optical Feedback for Self Alignment," Proceedings of the 5$^{th}$ Interservice/Industry Training Equipment Conference, AD–A142, vol. 1, pp. 1–9, Washington, D.C., Nov. 14–16, 1983.

Lyon, Paul et al., "A Self–Aligning CRT Projection System with Digital Correction," SID 84 Digest, pp. 108–111, Palisades Institute for Research Services, Inc., New York, New York, Jun. 1984.

Lyon, Paul, "Edge–Blending Multiple Projection Displays on a Dome Surface to Form Continuous Wide Angle Fields–Of–View," Proceedings of the 7$^{th}$ Interservice/Industry Training, Simulation Education Conference, pp. 203–209, 1985.

Monroe, Eric G. et al., "CIG Edge Conservation Evaluation and Application to Visual Flight Simulation," Proceedings of the 10$^{th}$ Naval Training Equipment Center/Industry Conference, pp. 157–167/168, Nov. 15–17, 1977.

Gardner, Geoffrey Dr., "Computer–Generated Texturing to Model Real–World Features," Proceedings of the 1$^{st}$ Interservice/Industry Training, Simulation Education Conference,, pp. 239–245/246, 1979.

Hebb, Richard C., "Computer Program for Distortion Analysis in Spherical Screen Displays," Proceedings of the 3$^{rd}$ Interservice/Industry Training, Simulation Education Conference, pp. 19–27, 1981.

Wyckoff, Bradley E., "Managing Cost/Performance Tradeoffs for Successful Visual Training," Proceedings of the 11$^{th}$ Interservice/Industry Training, Simulation Education Conference, pp. 471–477, 1989.

Black, Stephen, "Digital Processing of 3–D Data to Generate Interactive Real–Time Dynamic Pictures," Proceedings of the Society of Photo–Optical Instrumentation Engineers in Conjunction with The IEEE Computer Society International Optical Computing Conference, Three Dimensional Engineering, vol. 120, pp. 52–61, San Diego, California, Aug. 25–26, 1977.

Leavy, Wayne P., et al., "Closing the Gap Between Aircraft and Simulator Training With Limited Field–Of–View Visual Systems," Proceedings of the 5$^{th}$ Interservice/Industry Training Equipment Conference, AD–A142 774, vol. 1, pp. 10–18, Washington D.C., Nov. 14–16, 1983.

Page, J. et al., "Advanced Raster/Calligraphic CRT Projector," Proceedings of the 12$^{th}$ Interservice/Industry Training Systems–Conference, pp. 286–294, Orlando Florida, Nov. 1990.

Latham, Roy, "Image Generator Architectures and Features," Proceedings of the 5$^{th}$ Interservice/Industry Training Equipment Conference, AD–A142 774, vol. 1, pp. 19–26, Washington, D.C., Nov. 14–16, 1983.

Lyon, Paul, "A New CRT Projector With Isotropic Edge–Blending and Digital Convergence," Proceedings of the 13$^{th}$ Interservice/Industry Training Systems Conference, Orlando, Florida, pp. 278–283, Dec. 1991.

* cited by examiner

METHOD AND APPARATUS FOR SEAMLESS INTEGRATION OF MULTIPLE VIDEO PROJECTORS

CROSS-REFERENCE TO RELATED APPLICATION

The present application claims the priority of U.S. Provisional Application No. 60/211,768 entitled "Method and Apparatus for Seamless Integration of Multiple Non-CRT Video Projectors" filed Jun. 13, 2000, the contents of which are fully incorporated by reference herein.

BACKGROUND OF THE INVENTION

Arrayed display systems are increasingly being used to provide composite images that are larger, brighter, and have higher resolution than, e.g., a single image displayed on a desktop monitor or a television. In arrayed display systems, multiple images are typically placed adjacently to one another horizontally or vertically to form a single composite image. The images are typically generated by a computer, specialty cameras, or specially prepared media, which may include a movie film divided into multiple portions and stored in multiple specially formatted DVDs, laser disks or multi-channel video servers. When using an arrayed display system, it is highly desirable to minimize appearance of segregation between the image segments that are arrayed to form the composite image.

The arrayed display systems include projector-based display systems made up of multiple projectors to provide a projected composite image. The projector-based arrayed display systems often utilize edge blending technology in order to create a single seamless composite image. In edge blending technology, to make a seamless composite image from multiple projectors, a portion of the image from each projector is typically overlapped with a portion of the image from an adjacent projector and a smoothing correction or ramping factor on each side of the overlapped region is used to blend the brightness of the overlapping images together so that they appear uniform and seamless.

Examples of edge blending technology are described in U.S. Pat. No. 4,974,073 entitled "Seamless Video Display," U.S. Pat. No. 5,136,390 entitled "Adjustable Multiple Image Display Smoothing Method and Apparatus," and U.S. Pat. No. 6,115,022 entitled "Method and Apparatus for Adjusting Multiple Projected Raster Images," all of which are fully incorporated by reference herein.

These patents disclose, but are not limited to, methods for defining the raster and overall projection regions as well as a method for defining the edges of the overlapped region for edge blending purposes. They further describe detailed methods for ramping and adjusting the bright overlapping portions of the images in order to create apparently seamless images. By defining the overlapped regions in these patents, non-overlapped regions are also defined by default.

The projector technologies have progressed from systems that were based on cathode ray tube (CRT) projectors to various formats of display engines (projectors) that include Liquid Crystal Display (LCD), Image Light Amplification (ILA-Hughes/JVC), Liquid Crystal on Silicon (Lcos/Various), Digital Light Processing or Digital Micro Mirrors (DLP—Texas Instruments) projectors and others. The display engines that are not based on the CRT technology are sometimes referred to as non-CRT projectors or non-CRT display engines.

These non-CRT projectors typically create a projected image by applying a constant light source to a medium with variable reflectivity or translucence. The use of variable reflectivity (or variable translucence) is different from the method used in the CRT technology, which uses an electron beam to excite phosphor in order to create a variable luminance using the cathode ray tube.

Since the CRT provides a variable luminance based on the strength of the electron beam, the luminance of the CRT can be turned all the way down to where the CRT has zero photonic output. A perfect non-CRT projector with a constant light source may also be able to tune the light or photonic output to zero. However, in practice, currently available non-CRT projectors typically provide a residual amount of light and generate residual brightness even when the desired image is fully black. The residual light that is inherent to typical non-CRT projectors can be referred to as an r factor or residual factor, which is a measure of photonic leakage per unit area of the projected image.

The value of the residual factor in the overlapped region between two adjacent images in a projector array is approximately equal to the sum of the values of the residual factors of the two adjacent images or Ra+Rb, where Ra is the residual factor of the first adjacent image and Rb is the residual factor of the second adjacent image. In another example where the projectors are adjacent in two directions—side by side as well as over and under, and assuming that the residual factors of the projectors are Ra, Rb, Rc and Rd, respectively, the residual factor in the region where all four images overlap is approximately equal to the sum of the residual factors, i.e., Ra+Rb+Rc+Rd. Thus, a relatively bright seam or a region may appear in the overlapped areas of a projection array when the composite image is displaying a dark scene.

Thus, edge blending technology typically does not work well with non-CRT projectors that cannot be tuned to create zero photonic output when the image is to be at a very dark gray level, or fully black. Therefore, when using non-CRT projectors, use of edge blending technology has a limitation, and a method of making the minimum black level across the composite image uniform may be needed especially when the video signal going to the projector is already at a minimum, but the projector is still leaking photons. In this case, the difference in residual brightness between non-overlapped and overlapped regions cannot be resolved through further attenuation of the signal in the overlap.

Therefore, it is desirable to develop a method of reducing the non-uniformity in the overlapped regions caused by the residual photonic leakage which complements edge blending technology in order to generate an apparently seamless composite image when, for example, non-CRT projectors are used.

SUMMARY OF THE INVENTION

In an embodiment according to the present invention, a method of generating an apparently seamless composite image from a plurality of video signals is provided. The video signals correspond to discrete images, and at least one of the discrete images has an overlap with at least one other of the discrete images. The video signals are edge blended to reduce the appearance of a seam in the overlap between the corresponding discrete images. Then, the video signals are adjusted to raise minimum black levels of non-overlapped regions of the corresponding discrete images, without affecting the rest of the video signals, to match the minimum black level of the overlap.

In another embodiment of the present invention, a method of smoothing the brightness and minimum black level of two adjoining overlapping video images is provided. The video images are produced from two discrete video signals. The signals comprise a plurality of detail elements, each detail element having a brightness component. A predetermined set of smoothing factors is applied to the brightness components of the detail elements of the two video signals, each smoothing factor being associated with a the detail element to which it is applied. The images, as modified by the smoothing factors, are projected onto a display. Individual smoothing factors are modified independently of one another in response to the appearance of the projected display. A representation of the smoothing factor modifications is stored. The smoothing factors are used to adjust the brightness components of the detail elements in an overlapped region to lower a maximum bright level of the overlapped region to match maximum bright levels of non-overlapped regions, and to adjust the brightness components of the detail elements in the non-overlapped regions to raise minimum black levels to match the minimum black level of the overlapped region.

In yet another embodiment of the present invention, a system for adjusting video signals representing an array of raster images to compensate for projection defects is provided. The system includes a plurality of projectors, which are used to display the array of raster images to form a composite projected image. The system also includes an array of smoothing factors, each smoothing factor being associated with a portion of the composite projected image. Further, the system includes means for applying smoothing factors to the video signals to remove the projection defects resulting from display of the array of raster images. The projection defects comprise differences in maximum bright levels and minimum black levels between overlapped and non-overlapped regions of the composite projected image.

In an alternate embodiment of the present invention, a method of generating an apparently seamless composite image from a plurality of video signals is provided. The video signals correspond to discrete images, and at least one of the discrete images has an overlap with at least one other of the discrete images. Portions of the video signals corresponding to non-overlapped regions are adjusted to raise the brightness of the non-overlapped regions to match the brightness of the overlap.

BRIEF DESCRIPTION OF THE DRAWINGS

These and other aspects of the invention may be understood by reference to the following detailed description, taken in conjunction with the accompanying drawings, which are briefly described below.

DETAILED DESCRIPTION

In one embodiment of the present invention, a solution is provided to solve the problem caused by photonic leakage from projectors when overlapping multiple images are used to form a single composite image. The described embodiments of the present invention may be used together with edge blending technology to generate a seamless composite image from multiple projectors. For example, the edge blending technology is directed to the attenuation of overlapped regions, while the described embodiments of the present invention are directed to boosting of non-overlapped regions instead of, or in addition to, the attenuation of the overlapped regions. Examples of edge blending technology are disclosed in U.S. Pat. Nos. 4,974,073, 5,136,390 and 6,115,022, which have been fully incorporated by reference.

Figure 1:
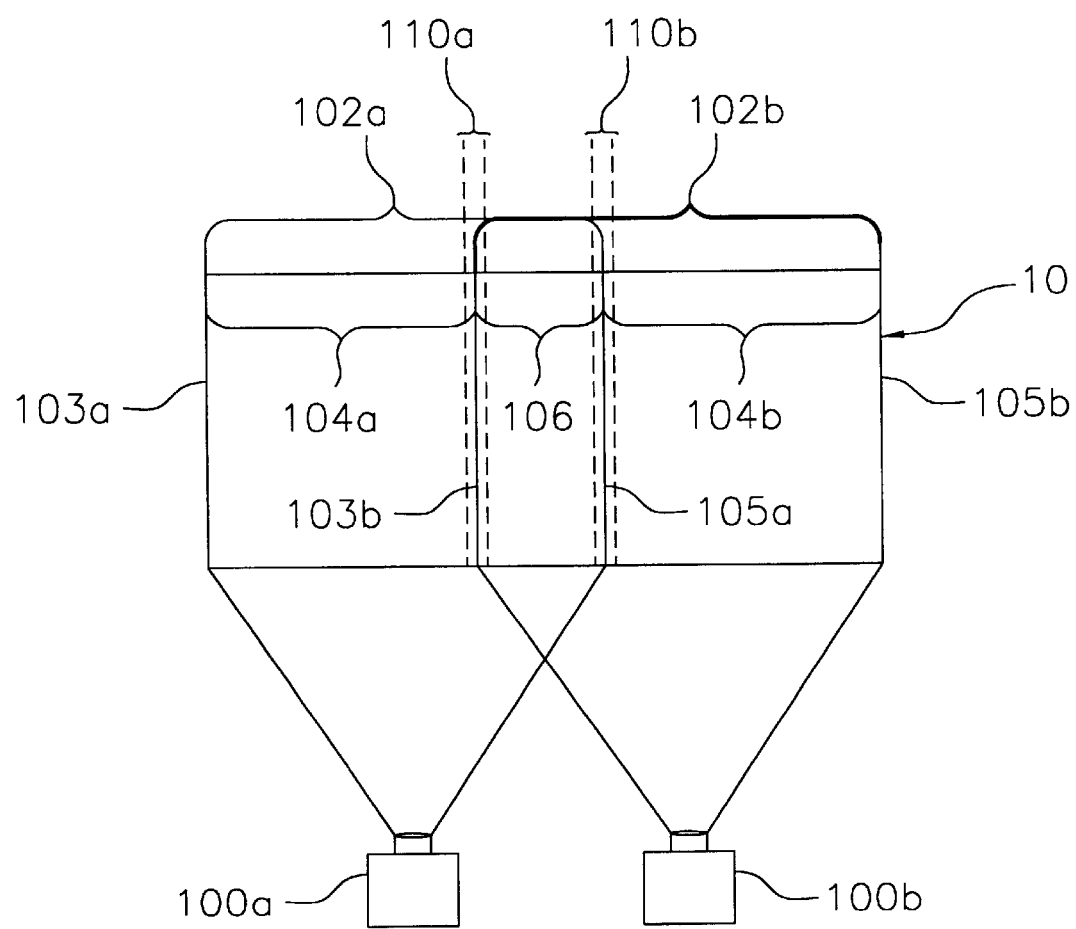
FIG. 1 is an illustration of a composite projected image generated by projecting overlapping images from two projectors in an embodiment according to the present invention.

FIG. 1 is an illustration that shows a composite image 10 generated by projecting overlapping images from projectors 100a and 100b in one embodiment of the present invention. The projectors 100a and 100b may be non-CRT projectors such as LCD, ILA, Lcos, DLP or any other conventional or non-conventional projectors. A region 102a is the image raster area of the projected image generated by the projector 100a. Edges 103a and 105a, respectively, are the beginning edge and the ending edge of the raster area 102a. A region 102b is the image raster area of the projected image generated by the projector 100b. Edges 103b and 105b, respectively, are the beginning edge and the ending edge of the raster area 102b.

When there is residual photonic leakage in black images from the projectors, the value of the residual factor from each projector in each of the regions 102a and 102b, if they were not overlapped, would be equal to Ra for projector 100a and Rb for projector 100b. A sub-region 104a is a non-overlapped raster segment of the first projector 100a while a sub-region 104b is a non-overlapped raster segment of the second projector 100b. Therefore, the residual factors for the non-overlapped sub-regions 104a and 104b are equal to Ra and Rb, respectively.

A sub-region 106 is an overlapped raster segment between the raster areas 102a and 102b of the first and second projectors 100a and 100b. Since the projected images from the first and second projectors 100a and 100b are overlapped in the sub-region 106, the residual factors from both of the projected images typically are summed in the sub-region 106 to form a new residual factor. Therefore, the residual factor for the sub-region 106 is approximately equal to Ra+Rb.

The actual level of gray caused by the residual factor may be variable based on factors including but not limited to: the technology used in the projector, the settings of that projector, the light output of the constant light source lamp, the particular optical design of the projector and the projected size of the image. An example of these variable is a particular projector which would have a residual factor with a smaller value if the image were projected over a larger surface. This is because the total photonic (or light) leakage from a particular projector is typically constant. By spreading the constant photonic leakage over a larger physical reflective area, the amount of photonic leakage applied to each unit of measure decreases as the number of units of measure increases.

When the residual factor has a value of Ra+Rb, and if the ambient light level in the environment where the image is being viewed is above approximately Ra+Rb, then the image degradation of the bright band in the dark part of the image or dark scenes may not be visible. However, images are often viewed in darkened environment, and therefore, it may be desirable to reduce the image degradation caused by the bright band in the dark part of the image or dark scenes.

Therefore, in one embodiment of the present invention, the minimum black level in the non-overlapped regions is raised to substantially match the minimum black level in the overlapped region. In FIG. 1, the minimum black level in the overlapped region 106 is defined by the residual factor of approximately Ra+Rb, while the minimum black levels in the non-overlapped regions 104a and 104b are defined by the residual factors Ra and Rb, respectively. By boosting the residual factors in the non-overlapped regions to approximately Ra+Rb, an overall minimum black level of Ra+Rb may be maintained across the composite projected image.

When the minimum black levels of the non-overlapped regions are boosted, the blackest an image may be in dark areas of the non-overlapped regions is initially reduced. To bring the minimum black level down closer to the absolute black level, i.e., with zero photonic output, the projected composite image may then be passed through a neutral density filter, which may be placed either inside or outside the projector. The current generation of non-CRT projectors typically are bright enough so that reduction of overall brightness due to passing of the projected image through the neutral density filter may be tolerated.

A region 110a is a transitional region between the non-overlapped region 104a and the overlapped region 106, and a region 110b is a transitional region between the non-overlapped region 104b and the overlapped region 106. The transitional regions 110a and 110b preferably are arbitrary areas in which smoothing and/or ramping function is performed between the boosted and non-boosted black regions. In order to smooth transition between the electronically raised black regions 104a and 104b with the overlapped region 106, in an embodiment according to the present invention, a mechanical and/or electronic, smoothing and/or ramping function is implemented in the transitional regions 110a and 110b.

In addition to processing the video signal to solve the problems caused by photonic leakage, in one embodiment of the present invention, a physical mask may be applied to mask areas of the display that is non-raster in nature and is displayed by the projector. The physical mask may also be used to smooth the edge of transition between the non-overlapped and overlapped regions.

Figure 2:
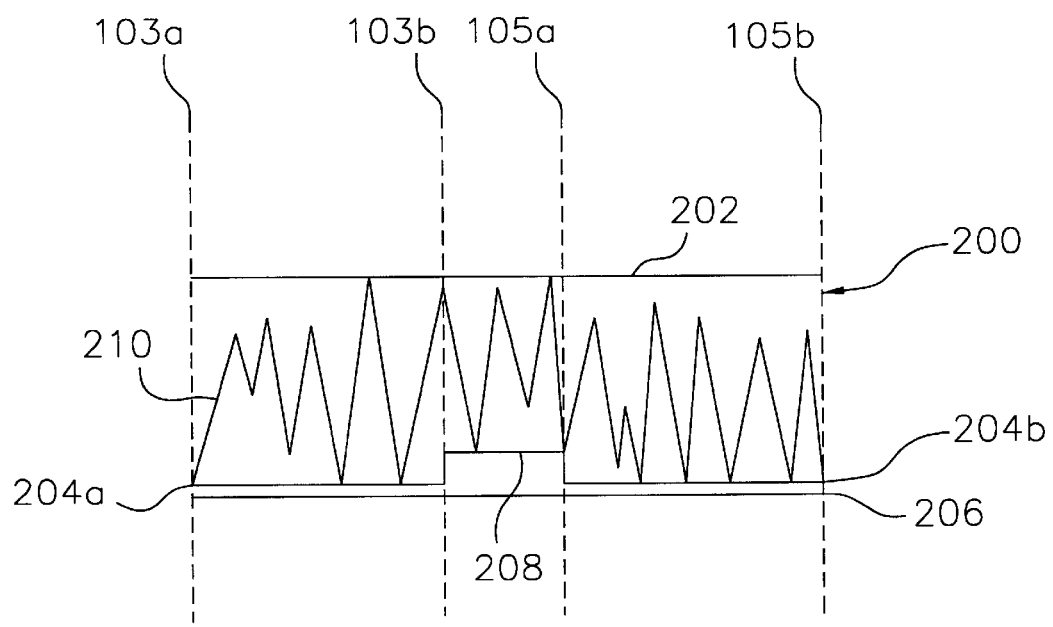
FIG. 2 is a signal diagram of an edge blended video signal displayed across the display areas of two projectors, showing that an residual factor at an overlapped region is the sum of the residual factors from the overlapped images.

FIG. 2 is a signal diagram 200 of a video signal 210 across the display areas of two projectors, such as the projectors 100a and 100b of FIG. 1. FIG. 2 illustrates relative levels of the various parts of the video signal 210 as it would appear when the video signals from two adjacent projectors have been integrated through, e.g., the use of brightness ramping or smoothing edge blending technology.

The projected image from the first projector preferably is bounded by edges 103a and 105a. The projected image from the second projector preferably is bounded by edges 103b and 105b. The video signal 210 preferably has a maximum signal level 202. It should be noted that, if the edge blending is not used and the projected images from the first and second projectors are simply overlapped between the edges 103b and 105a, the video signal 210 representing the composite projected image in the overlapped region would have a maximum signal level of approximately twice the maximum signal level 202. A level 206 indicates an absolute black level, in which the photonic output is zero.

A level 204a is the minimum black level due to the residual factor of Ra from a first projector. A level 204b is the minimum black level due to the residual factor of Rb from a second projector. A level 208 indicates further increase to the minimum black level due to the sum of photonic leakage from the first and second projectors. The level 208, for example, have the residual factor with the value of approximately Ra+Rb.

Since the minimum black level 208 of the overlapped region has the residual factor value of approximately Ra+Rb, which is higher than the minimum black level 204a and 204b of the non-overlapped regions, when the composite picture is displayed in a dark room, dark portion of the video signal may display a visible gray band in the overlapped region between the edges 103b and 105a.

Figure 3:
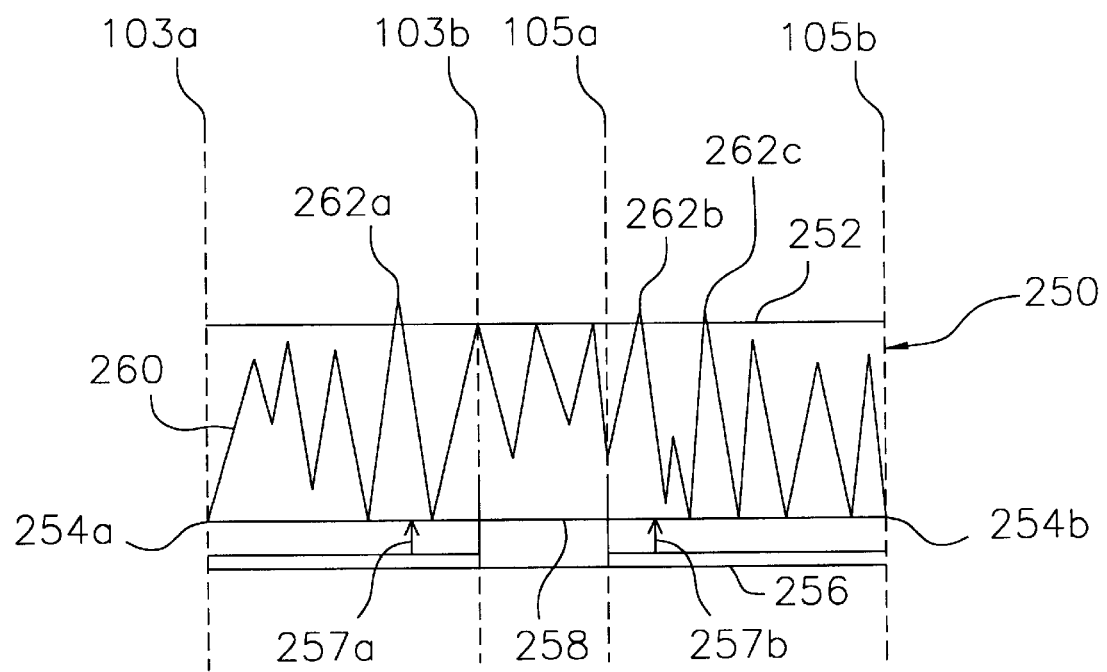
FIG. 3 is a signal diagram, which illustrates an edge blended video signal when the video signals of non-overlapped regions are boosted uniformly.

FIG. 3 is a signal diagram 250 that illustrates the minimum black level for non-overlapped regions being boosted simply by raising gain. When both the dark and bright levels of the non-overlapped regions of the video signal 260 are uniformly boosted as indicated by arrows 257a and 257b, the maximum value of the video signal 260 may become higher than the maximum video signal level 252, which is substantially the same as the maximum video signal level 202 of FIG. 2. For example, one or more peaks, e.g., peaks 262a, 262b and 262c, of the video signal 260 may be at a higher level than the maximum video level 252.

Therefore, as the minimum black level is increased in the non-overlapped regions, it is important that the entire video signal levels are not also increased as illustrated in FIG. 3 or bright level aberrations may be introduced to the video signal as a result of adjusting the minimum black level. A mixing circuit block (as illustrated in FIG. 4) preferably is used to combine the increased black level with the rest of the video signal filtered out and the composite video signal so that only the black portion of the video signal is raised—and only in the non-overlapped regions.

Figure 4:
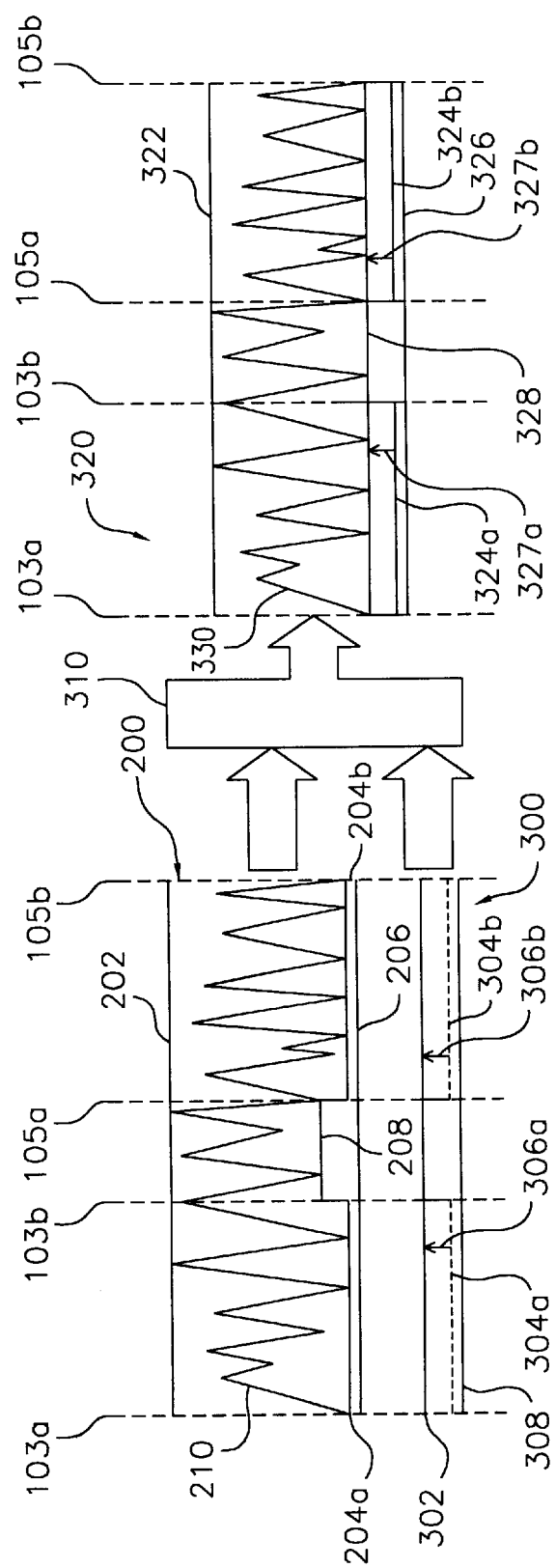
FIG. 4 is a process diagram, which illustrates boosting of the minimum black level for the non-overlapped regions of an edge blended video signal using a mixer circuit in an embodiment according to the present invention.

FIG. 4 is a process diagram, which illustrates boosting of the minimum black level for non-overlapped regions. The signal diagram 200 preferably is substantially the same as the signal diagram 200 of FIG. 2. A signal diagram 300 preferably illustrates boosting of minimum black levels 304a and 304b, respectively, in the non-overlapped regions (between edges 103a, 103b and edges 105a, 105b) from the residual factor of Ra and Rb, respectively, to the residual factor of Ra+Rb to align with the minimum black level 302 of the overlapped region (between the edges 103b and 105a).

Arrows 306a and 306b, respectively, are indicative of a level boost to the black level of the non-overlapped regions so that the minimum black level of both the overlapped and non-overlapped regions have a residual factor of approximately Ra+Rb.

A mixing circuit block 310 sums the increased black levels of the non-overlapped regions to the black portion of the signal without changing the level of the video signal 210 itself so that the minimum black level for the non-overlapped region is increased to make the minimum black level to be approximately Ra+Rb across the video signal 210. In other words, the mixing circuit block 310 preferably moves the dynamic characteristics of the dark portion of the video signal 210 without affecting the total video signal.

A signal diagram 320 preferably illustrates a result of boosting the minimum black level in non-overlapped regions without adjusting the bright portion of the video signal. A level 322 represents the maximum level of the video signal 330. The level 322 preferably is substantially the same as the level 202, which is the maximum video level prior to mixing.

The video signal 330 is substantially the same as the video signal 210 prior to mixing except that a minimum black level 328 is indicative of a residual factor having a value of approximately Ra+Rb across the video signal 330. The minimum black level 328 preferably is substantially the same as the minimum black level 208 of the overlapped region between the edges 103b and 105a prior to mixing.

Arrows 327a and 327b, respectively, indicate boosting of the minimum black levels 324a and 324b, corresponding to the residual factors of Ra and Rb, respectively, to the level 328 to uniformize the minimum black level corresponding to the residual factor of approximately Ra+Rb. An absolute black level 326 preferably is substantially the same as the absolute black level 206 prior to mixing.

A physical neutral density filter may then be applied to the projection in order to make the blackest portion of the image darker. The neutral density filter may be implemented inside or outside the projector as long as it is in the optical path of the projected image. The neutral density filter typically reduces brightness of the overall projected image being filtered. Thus, when the neutral density filter is applied, this typically reduces the maximum brightness of the total image as illustrated in FIG. 5.

Figure 5:
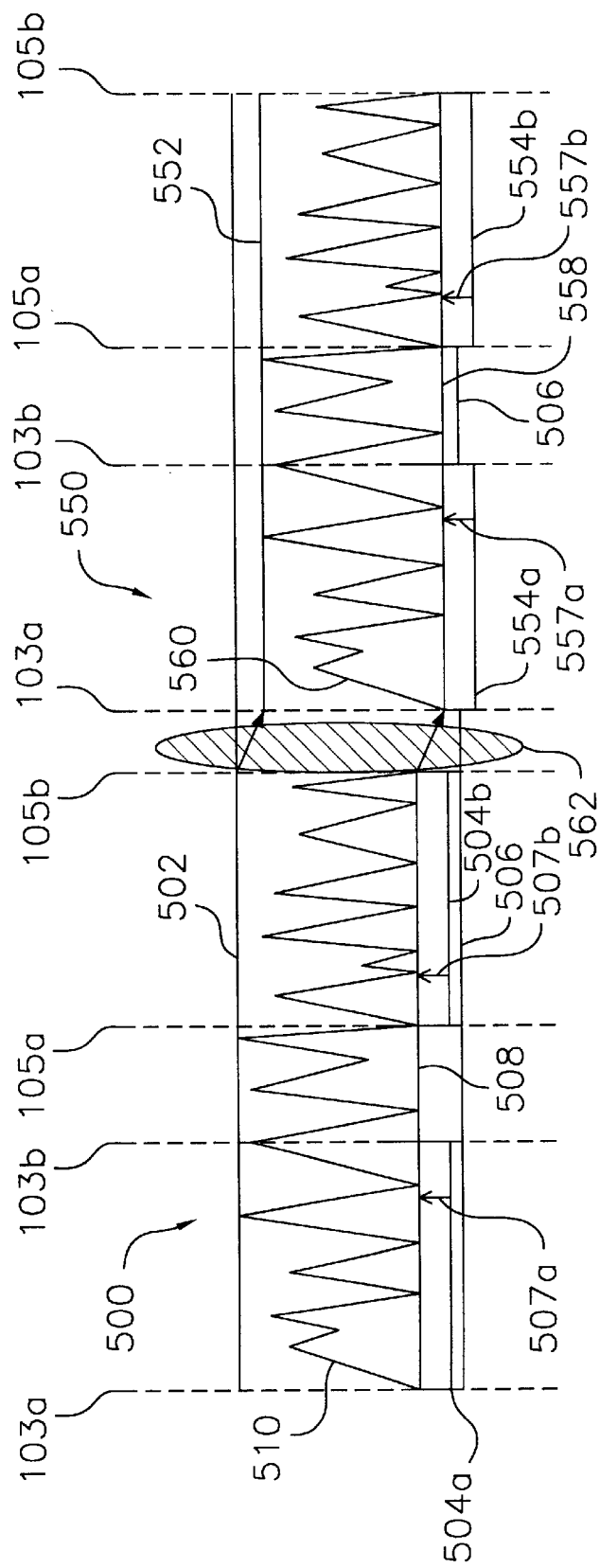
FIG. 5 is a signal diagram which illustrates an edge blended video signal before and after passing the video signal through a neutral density filter in an embodiment according to the present invention.

FIG. 5 illustrates two signal diagrams 500 and 550. A video signal 510 is a composite signal of signals from two side-by-side projectors that has been corrected with edge blending (e.g., of the overlapped region) and black level boosting (of the non-overlapped regions). As illustrated in FIG. 5, the minimum black levels 504a and 504b of the non-overlapped regions of the video signal 510 have been boosted as indicated by arrows 507a and 507b, to be substantially the same as the minimum black level 508 of the overlapped region. A level 502 is the maximum brightness level and a level 508 is the minimum black level of the video signal 510.

The maximum brightness level 502, the video signal 510 and the minimum black level 508 preferably are lowered by passing the signals through a neutral density filter 562, thus lowering the signal level of all parts of the video signal 510. The signal diagram 550 illustrates a video signal 560 resulting from passing the video signal 510 through the neutral density filter 562. The video signal 560 has a new maximum brightness level 552 and a new minimum black level 558, each of which is lower than the corresponding signal level of the video signal 510.

Figure 6:
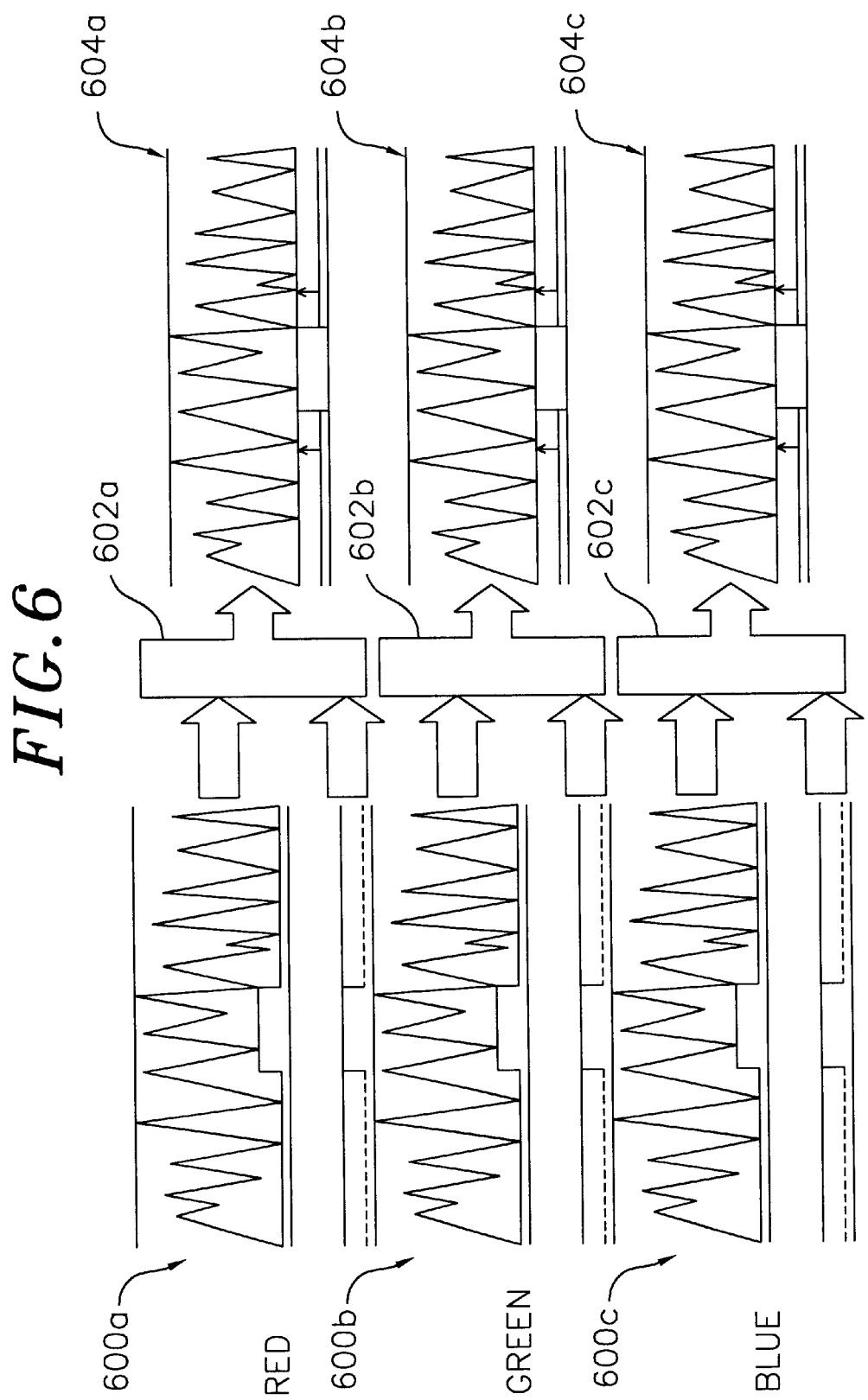
FIG. 6 illustrates signal diagrams which show minimum black level boosting for each of the red, green and blue component signals of an edge blended video signal in an embodiment according to the present invention.

FIG. 6 illustrates signal diagrams 600a, 600b and 600c that illustrate adjustment of the minimum black level in the non-overlapped region by red, blue and green video signals separately where the signal representing each color is modified independently of other colors. The mixing circuit blocks 602a, 602b and 602c are used to mix red, blue and green component video signals, respectively, independently of one another to generate red, green and blue component video signals 604a, 604b and 604c, respectively, having substantially uniform minimum black level across the overlapped and non-overlapped regions.

Figure 7:
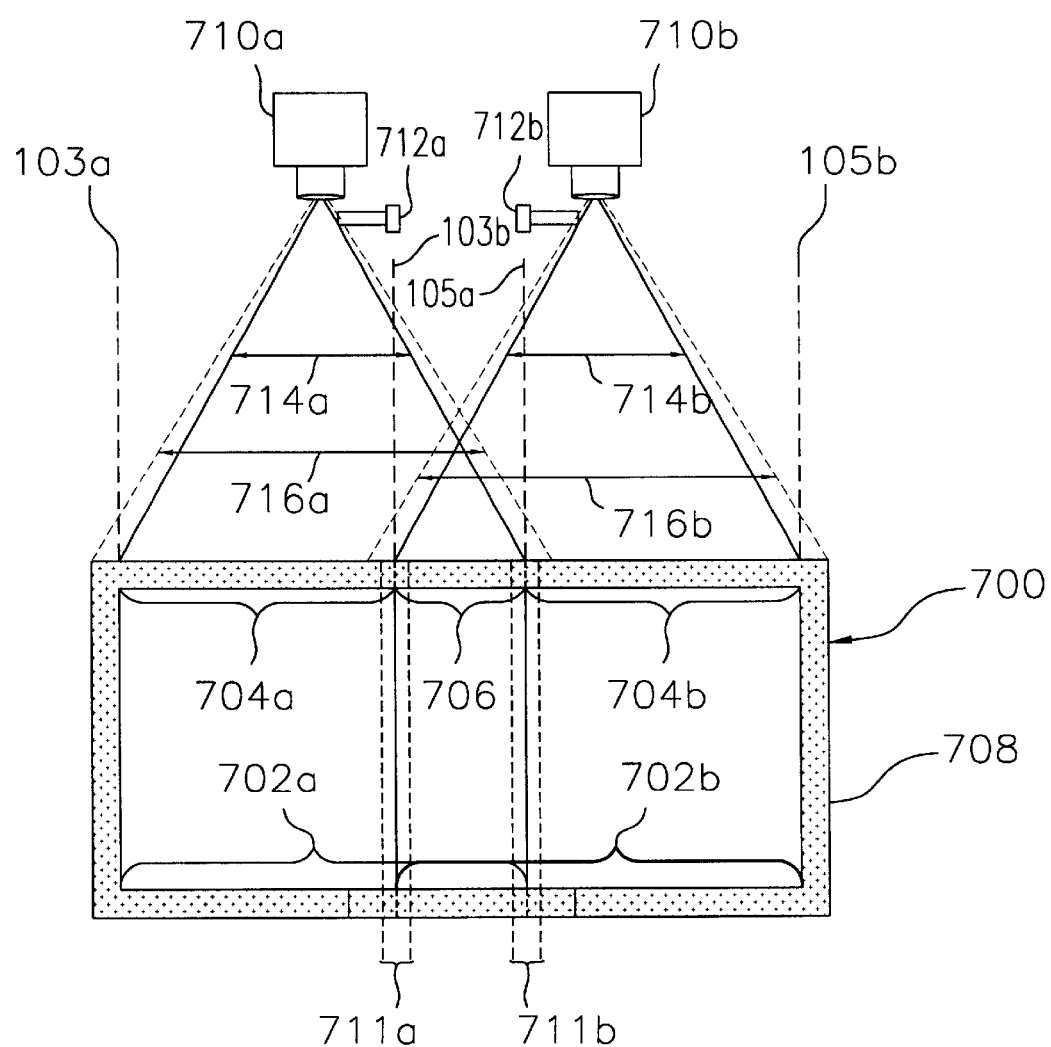
FIG. 7 is a composite image illustrating a residual layer of photonic energy outside the raster display area of the projectors, and masks for blocking out that residual layer of photonic energy in an embodiment according to the present invention.

FIG. 7 is a composite image 700 in one embodiment of the present invention. The composite image 700 includes a projected image 702a from a projector 710a and a projected image 702b from a projector 710b. The projected images 702a and 702b are overlapped to form an overlapped region 706. The projected images 702a and 702b also include non-overlapped regions 704a and 704b, respectively.

The composite image 700 also illustrates a residual layer of photonic energy 708 outside the raster area of the projectors. The projected beam widths 714a and 714b, respectively, correspond to image raters of the projected images 702a and 702b. Further, the projected beam widths 716a and 716b, respectively, correspond to entire projected images including the residual layer of photonic energy 708 from the projectors 710a and 710b.

Each of the non-overlapped regions 704a and 704b may be adjusted for each of the three colors as indicated in FIG. 6. Further, there may be a similar but separate adjustment capability in the overlapped region 706 for each of the three colors. With the above capability, including the ability to specify the edges of the image raster and via this the overlapped region, the overall black levels, bright levels and the color balances of each may be adjusted in the overlapped region 706 and the non-overlapped regions 704a and 704b.

The residual layer of photonic energy 708 is emitted by the projectors, typically due to design and/or internal masking defects, and it is generally outside the raster regions of the projectors. The outer layer of photonic energy 708 is typically lower in level than the residual black levels or r factor referenced earlier and may be referred to as a sub-r factor. The part of this outside region that is fully outside the raster regions 704a, 704b and 706 typically are not controlled by any type of signal processing since it is outside the intended display region of the signal. Therefore, some type of physical masking may be required on the projectors to block out the sub-r factor.

The outer layer of photonic energy from the projector 710a may be blocked by a mask 712a while the outer layer of photonic energy from the projector 710b may be blocked out by a mask 712b. The masks 712a and 712b as shown are outside the projectors, but in practice, they may be implemented inside the respective projectors. It should be noted that the masks may extend slightly "inward" from the non-raster regions and may be used to mask all of the transitional regions 711a and 711b between the non-overlapped regions 704a, 704b and the overlapped region 706. The edge of the masks may be made gently or smoothly by using a gradation of density from outside the transition regions 711a and 711b to the non-overlapped regions 704a and 704b, respectively.

Figure 8:
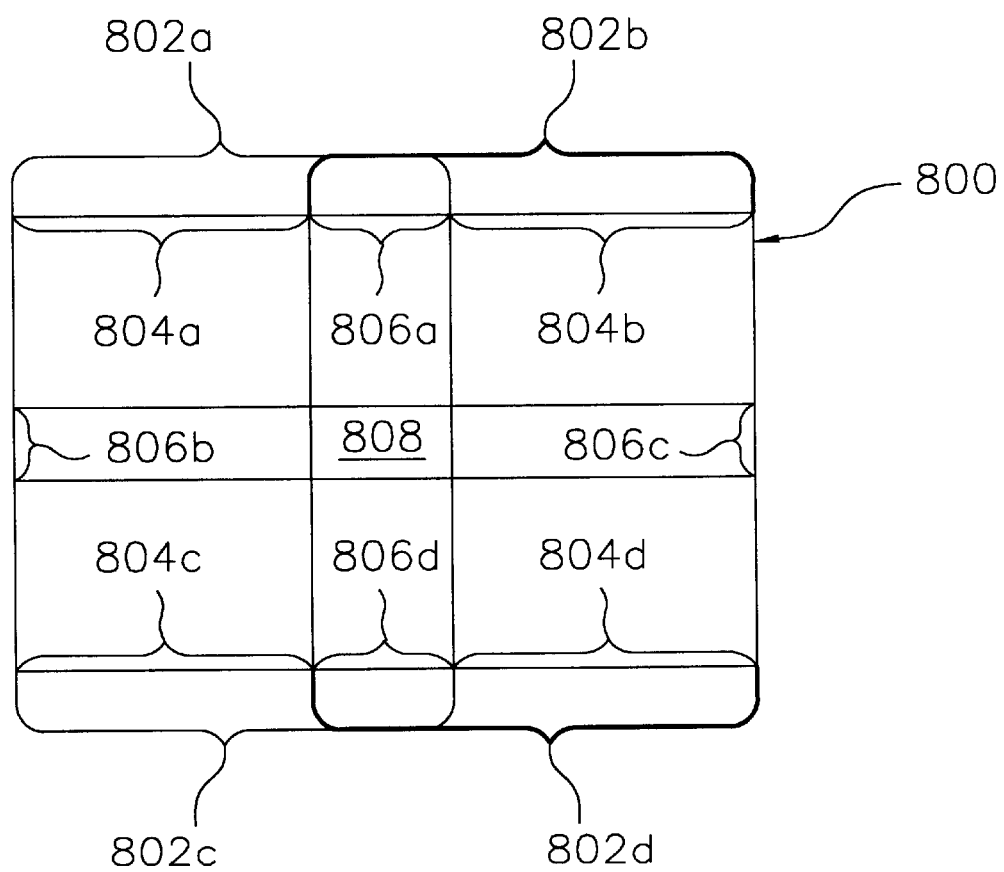
FIG. 8 is a composite image of projected images in 2×2 configuration to which an embodiment according to the present invention can be applied.

FIG. 8 is a composite image 800 in another embodiment of the present invention. In FIG. 8, four images 802a, 802b, 802c, 802d are placed adjacently to one another in a 2×2 configuration. In the composite image 800, non-overlapped regions 804a, 804b, 804c and 804d have residual factors of Ra, Rb, Rc and Rd, respectively. Overlapped regions 806a, 806b, 806c and 806d have residual factors of Ra+Rb, Ra+Rc, Rb+Rd and Rc+Rd, respectively. In region 808, all four of the images are overlapped, and thus the region 808 has a residual factor of Ra+Rb+Rc+Rd. The embodiments of the present invention including edge blending and minimum black level lifting may be used to remove undesirable artifacts in the overlapped regions.

In an alternate embodiment of the present invention, the uniformity of both the bright and dark portions of the video signals across the overlapped and non-overlapped regions may be realized without using edge blending technology. In this alternate embodiment, both the dark and bright portions of the non-overlapped regions may be lifted (e.g., via additional gain) until the uniformity of video signal level is achieved across the overlapped and non-overlapped regions.

Figure 9:
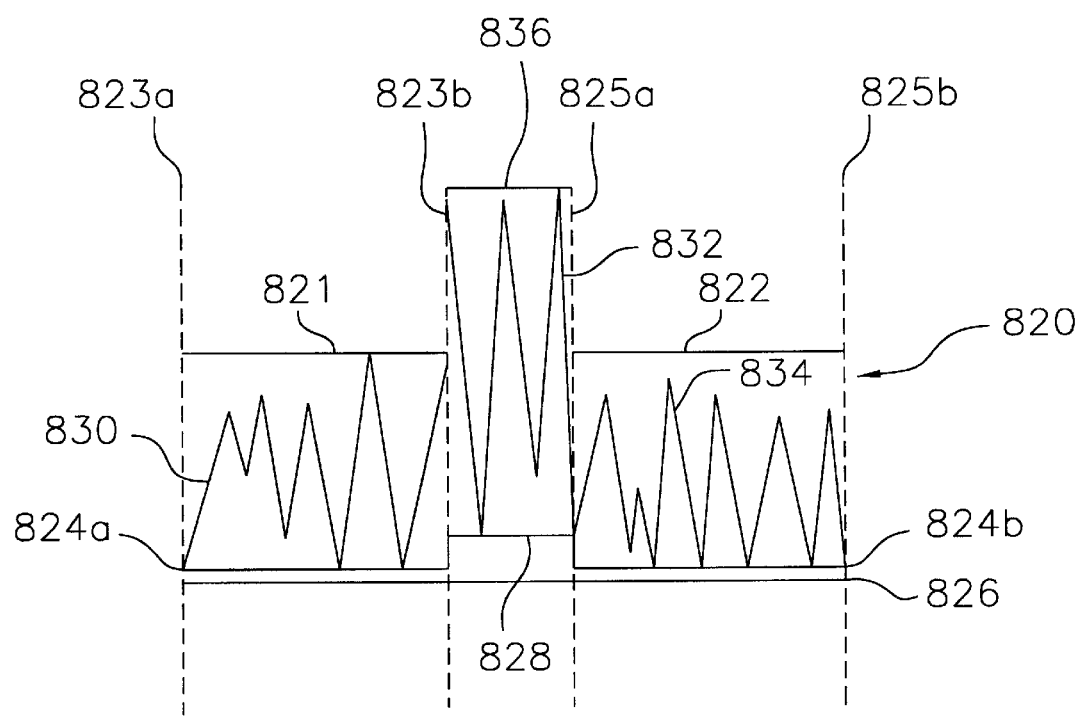
FIG. 9 is a signal diagram of two partially overlapping images without being modified using edge blending technology.

FIG. 9 is a signal diagram 820 of a composite video signal generated from two adjacent projectors in the alternate embodiment of the present invention. A video signal from the first projector has edges 823a and 825a, and a video signal from the second projector has edges 823b and 825b. A video signal 830 with a maximum signal level of 821 represents a non-overlapped region of the projected image from the first projector, and a video signal 834 with a maximum signal level of 822 represents a non-overlapped region of the projected image from the second projector. Finally, a video signal 832 with the maximum signal level 836 represents an overlapped region of the composite image formed by the projected images from first and second projectors. The maximum signal level 836 is approximately equal to the sum of the maximum signal levels 821 and 822 since the image brightness in the overlapped region has not been reduced in the absence of edge blending.

It should be noted that the video signal 832 does not represent an actual video signal from any projector. Rather, the video signal 832 is indicative of the brightness of the composite projected image in the overlapped region.

Video signal levels 824a and 824b, respectively, represent minimum black levels Ra, Rb due to photonic leakage for the video signals 830 and 834. A video signal level 828 represents a minimum black level for the video signal 832. A signal level 826 represents an absolute black level with no photonic output from the projectors.

Figure 10:
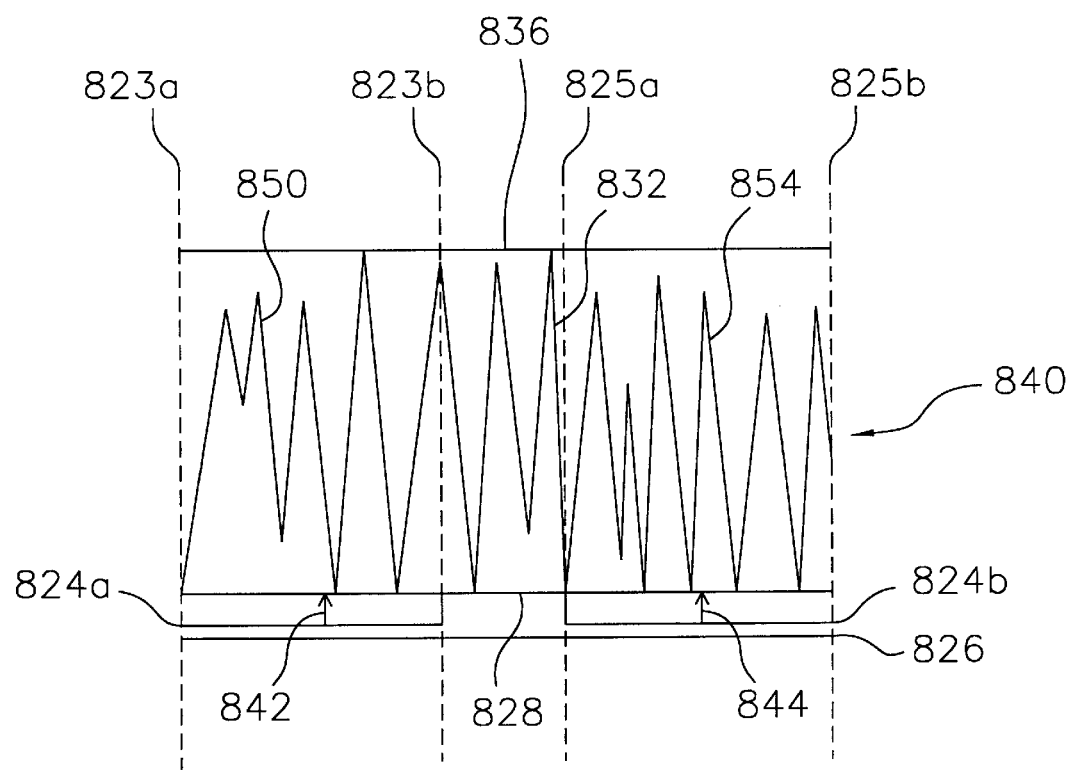
FIG. 10 is a signal diagram of non-overlapping regions being boosted in both bright and dark levels in an embodiment according to the present invention.

FIG. 10 is a signal diagram 840 of a composite video signal of FIG. 9, which has been modified to uniformize the video signal levels across the non-overlapped and overlapped regions. Video signals 850 and 854 have been adjusted so as to match the signal level of the video signal 832 in the overlapped region. Thus, maximum signal levels 835 and 837, respectively, of the video signals 850 and 854 are approximately equal to the maximum signal level 836 of the video signal 832. Further, the minimum black levels 824a and 824b, respectively, of the non-overlapped regions are raised as indicated by arrows 842 and 844 to match the minimum black level 828 of the overlapped region. The composite image then may be projected through a neutral density filter to reduce the brightness.

It should be noted that increasing the video signal level uniformly by a single factor in the non-overlapped region may not result in a proper adjustment of both the bright portion of the signal and the dark portion (e.g., minimum black level) since the projector function for converting from the video signal to the projector image brightness may not be linear. For example, adjusting the video signal to double the brightness of the bright portion of the projected image may not resulting in doubling the brightness of the dark portion (e.g., for minimum black level adjustment) of the project image. Therefore, a gamma factor or non-linearity compensation, based on projector characteristics, may be required for the proper adjustment of both the bright and dark portions of the non-overlapped regions to match those of the overlapped region.

In this embodiment, the pixels of each projector preferably should be aligned perfectly with corresponding pixels of all other projectors that are used to build the composite image. Further, the projectors preferably should have capacity for projecting video signals that represent increased brightness in the non-overlapped regions to match the brightness of the overlapped region.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

For example, those of ordinary skill in the art would recognize that the principles of the described embodiments can be applied to generate a composite image from any number of projectors arrayed vertically, horizontally or in matrix configuration with multiple columns and multiple rows.

What is claimed is:

1. A method of generating an apparently seamless composite image from a plurality of video signals, the video signals corresponding to discrete images, at least one of the discrete images having an overlap with at least one other of the discrete images, the method comprising the steps of:
   edge blending the video signals to reduce the appearance of a seam in the overlap between the corresponding discrete images; and
   adjusting the video signals to raise minimum black levels of non-overlapped regions of the corresponding discrete images, without affecting the rest of the video signals, to match the minimum black level of the overlap,
   wherein the discrete images are projected through a non-graded neutral density filter to bring down the minimum black level of all parts of the discrete images closer to an absolute black level with zero photonic output.

2. A method of generating an apparently seamless composite image from a plurality of video signals, the video signals corresponding to discrete images, at least one of the discrete images having an overlap with at least one other of the discrete images, the method comprising the steps of:
   edge blending the video signals to reduce the appearance of a seam in the overlap between the corresponding discrete images; and
   adjusting the video signals to raise minimum black levels of non-overlapped regions of the corresponding discrete images, without affecting the rest of the video signals, to match the minimum black level of the overlap,
   wherein physical masks are applied to mask areas of the discrete images that are non-raster in nature and are displayed by the projectors.

3. A method of generating an apparently seamless composite image from a plurality of video signals, the video signals corresponding to discrete images, at least one of the discrete images having an overlap with at least one other of the discrete images, the method comprising the steps of:
   edge blending the video signals to reduce the appearance of a seam in the overlap between the corresponding discrete images; and adjusting the video signals to raise minimum black levels of non-overlapped regions of the corresponding discrete images, without affecting the rest of the video signals, to match the minimum black level of the overlap, wherein physical masks are applied to mask areas of the discrete images that are non-raster in nature and are displayed by the projectors, and wherein the density of at least one of the physical masks is graded so as to smooth an edge of transition between the non-overlapped region and the overlap, or between raster and the non-raster areas.

4. A method of generating an apparently seamless composite image from a plurality of video signals, the video signals corresponding to discrete images, at least one of the discrete images having an overlap with at least one other of the discrete images, the method comprising the steps of:

edge blending the video signals to reduce the appearance of a seam in the overlap between the corresponding discrete images;

adjusting the video signals to raise minimum black levels of non-overlapped regions of the corresponding discrete images, without affecting the rest of the video signals, to match the minimum black level of the overlap; and determining edges of transition, said edges defining transitional regions between the overlap and non-overlapped regions in which smoothing or ramping is performed.

5. A method of smoothing the brightness and minimum black level of two adjoining overlapping video images, the video images being produced from two discrete video signals, the signals comprising a plurality of detail elements, each detail element having a brightness component, the method comprising the steps of:

applying a predetermined set of smoothing factors to the brightness components of the detail elements of the two video signals, each smoothing factor being associated with the detail element to which it is applied;

projecting the images, as modified by the smoothing factors, onto a display;

modifying individual smoothing factors independently of one another in response to the appearance of the projected display; and storing a representation of the smoothing factor modifications, wherein the smoothing factors are used to adjust the brightness components of the detail elements in an overlapped region to lower a maximum bright level of the overlapped region to match maximum bright levels of non-overlapped regions, and to adjust the brightness components of the detail elements in the non-overlapped regions to raise minimum black levels to match the minimum black level of the overlapped region, and wherein the step of modifying individual smoothing factors comprises the steps of:

projecting a cursor indicating the image location corresponding to a specific detail element onto the display; and modifying the smoothing factor associated with the specific detail element.

6. The method of claim 5, wherein the step of modifying individual smoothing factors further comprises the steps of:

moving the projected cursor to indicate the image location of a different specific detail element;

modifying the smoothing factor associated with the different specific detail element; and repeating the steps of moving the cursor and modifying the smoothing factor until a desired appearance for the projected images has been obtained.

7. A method of smoothing the brightness and minimum black level of two adjoining overlapping video images, the video images being produced from two discrete video signals, the signals comprising a plurality of detail elements, each detail element having a brightness component, the method comprising the steps of:

applying a predetermined set of smoothing factors to the brightness components of the detail elements of the two video signals, each smoothing factor being associated with the detail element to which it is applied;

projecting the images, as modified by the smoothing factors, onto a display;

a modifying individual smoothing factors independently of one another in response to the appearance of the projected display; and storing a representation of the smoothing factor modifications, wherein the smoothing factors are used to adjust the brightness components of the detail elements in an overlapped region to lower a maximum bright level of the overlapped region to match maximum bright levels of non-overlapped regions, and to adjust the brightness components of the detail elements in the non-overlapped regions to raise minimum black levels to match the minimum black level of the overlapped region, and wherein the images are projected through a non-graded neutral density filter to bring down the minimum black level of all parts of the discrete images closer to an absolute black level with zero photonic output.

8. A method of smoothing the brightness and minimum black level of two adjoining overlapping video images, the video images being produced from two discrete video signals, the signals comprising a plurality of detail elements, each detail element having a brightness component, the method comprising the steps of:

applying a predetermined set of smoothing factors to the brightness components of the detail elements of the two video signals, each smoothing factor being associated with the detail element to which it is applied;

projecting the images, as modified by the smoothing factors, onto a display;

modifying individual smoothing factors independently of one another in response to the appearance of the projected display; and storing a representation of the smoothing factor modifications, wherein the smoothing factors are used to adjust the brightness components of the detail elements in an overlapped region to lower a maximum bright level of the overlapped region to match maximum bright levels of non-overlapped regions, and to adjust the brightness components of the detail elements in the non-overlapped regions to raise minimum black levels to match the minimum black level of the overlapped region, and wherein physical masks are applied to mask areas of the images that are non-raster in nature and are projected on the display.

9. The method according to claim 8, wherein the density of at least one of the physical masks is graded so as to smooth an edge of transition between the non-overlapped region and the overlapped region.

10. A system for adjusting video signals representing an array of raster images to compensate for projection defects, the system comprising:
   a plurality of projectors to display the array of raster images to form a composite projected image;
   an array of smoothing factors, each smoothing factor being associated with a portion of the composite projected image; and
   means for applying smoothing factors to the video signals to remove the projection defects resulting from display of the array of raster images,
   wherein the projection defects comprise differences in maximum bright levels and minimum black levels between overlapped and non-overlapped regions of the composite projected image, and
   wherein the projectors generate non-raster output in addition to the raster images, the system further comprising one or more physical masks, wherein each mask is applied to mask at least a portion of the non-raster output.

11. The system according to claim 10, wherein the density of at least one of the physical masks is graded so as to smooth an edge of transition between the non-overlapped region and the overlapped region.

12. A method of generating an apparently seamless composite image from a plurality of video signals, the video signals corresponding to discrete images, at least one of the discrete images having an overlap with at least one other of the discrete images, the method comprising the step of:
   adjusting portions of the video signals corresponding to non-overlapped regions to raise the brightness of the non-overlapped regions to match the brightness of the overlap,
   wherein the brightness of bright portions of the non-overlapped regions are raised so that maximum bright levels of the non-overlapped regions match the maximum bright level of the overlap,
   wherein minimum black levels of the non-overlapped regions are raised so that the minimum black levels of the non-overlapped regions match that of the overlap, and
   wherein the maximum bright levels of the non-overlapped regions are raised by a different factor than the minimum black levels of the non-overlapped regions.

13. The method of claim 1, wherein the step of adjusting the video signals comprises the steps of: generating correction factors; and applying the correction factors to the video signals to raise the minimum black levels of the non-overlapped regions without affecting the rest of the video signals.

14. The method of claim 2, wherein the step of adjusting the video signals comprises the steps of: generating correction factors; and applying the correction factors to the video signals to raise the minimum black levels of the non-overlapped regions without affecting the rest of the video signals.

15. The method of claim 3, wherein the step of adjusting the video signals comprises the steps of: generating correction factors; and applying the correction factors to the video signals to raise the minimum black levels of the non-overlapped regions without affecting the rest of the video signals.

16. The method of claim 4, wherein the step of adjusting the video signals comprises the steps of: generating correction factors; and applying the correction factors to the video signals to raise the minimum black levels of the non-overlapped regions without affecting the rest of the video signals.

17. The method according to claim 8, wherein the density of at least one of the physical masks is graded so as to smooth an edge of transition between raster and the non-raster areas.

18. The system according to claim 10, wherein the density of at least one of the physical masks is graded so as to smooth an edge of transition between the raster and the non-raster areas.

* * * * *